United States Patent
Tackabury

(10) Patent No.: US 10,594,564 B2
(45) Date of Patent: Mar. 17, 2020

(54) NETWORK TOPOLOGY-PRESERVING INTERNET PROTOCOL ADDRESS ANONYMIZATION

(71) Applicant: International Business Machines Corporation, Armonk, NY (US)

(72) Inventor: Wayne Tackabury, West Tisbury, MA (US)

(73) Assignee: International Business Machines Corporation, Armonk, NY (US)

( * ) Notice: Subject to any disclaimer, the term of this patent is extended or adjusted under 35 U.S.C. 154(b) by 413 days.

(21) Appl. No.: 15/339,172

(22) Filed: Oct. 31, 2016

(65) Prior Publication Data

US 2018/0124008 A1 May 3, 2018

(51) Int. Cl.
| | |
|---|---|
| *G06F 15/16* | (2006.01) |
| *H04L 12/24* | (2006.01) |
| *H04L 29/06* | (2006.01) |
| *H04L 29/08* | (2006.01) |
| *H04L 29/12* | (2006.01) |

(52) U.S. Cl.
CPC .......... *H04L 41/12* (2013.01); *H04L 61/2514* (2013.01); *H04L 61/2539* (2013.01); *H04L 67/10* (2013.01); *H04L 67/16* (2013.01); *H04L 67/42* (2013.01)

(58) Field of Classification Search
CPC . H04L 41/12; H04L 61/2514; H04L 61/2539; H04L 67/10; H04L 67/16; H04L 67/42
See application file for complete search history.

(56) References Cited

U.S. PATENT DOCUMENTS

| | | | | |
|---|---|---|---|---|
| 6,693,909 B1* | 2/2004 | Mo | .......................... | H04L 41/12 370/392 |
| 7,362,752 B1* | 4/2008 | Kastenholz | ............. | H04L 41/12 370/389 |
| 7,853,680 B2 | 12/2010 | Phatak | | |
| 7,940,763 B1* | 5/2011 | Kastenholz | ......... | H04L 12/2856 370/255 |
| 7,984,169 B2* | 7/2011 | Brunell | ............... | G06F 21/6254 709/229 |

(Continued)

FOREIGN PATENT DOCUMENTS

DE    102009058446 A1    6/2011

OTHER PUBLICATIONS

"tcprewrite", Tcpreplay, last modified Sep. 5, 2012, accessed Oct. 20, 2016. 7 pages. http://tcpreplay.synfin.net/wiki/tcprewrite.

(Continued)

*Primary Examiner* — Chris Parry
*Assistant Examiner* — Dixon F Dabipi
(74) *Attorney, Agent, or Firm* — Yee & Associates, P.C.

(57) ABSTRACT

Anonymization of IP addresses of a network while preserving a topology of the network is provided. Information is received regarding a network topology. The information is analyzed to generate a first model of the network topology. The first model is converted into a second model preserving the network topology and obfuscating a mapping of the IP addresses. The second model is utilized to simulate processing of network packets consistent with actual processing of the network packets in the network topology.

25 Claims, 7 Drawing Sheets

(56) References Cited

U.S. PATENT DOCUMENTS

| | | | |
|---|---|---|---|
| 8,135,815 B2* | 3/2012 | Mayer | H04L 41/0893 709/221 |
| 8,264,988 B2 | 9/2012 | Zhang et al. | |
| 8,527,457 B2 | 9/2013 | Moon et al. | |
| 8,797,851 B2 | 8/2014 | Lewin-Eytan et al. | |
| 8,924,541 B2 | 12/2014 | Hadas et al. | |
| 9,641,434 B1* | 5/2017 | Laurence | H04L 45/7453 |
| 2005/0198049 A1* | 9/2005 | Ho | H04L 41/12 |
| 2011/0016119 A1* | 1/2011 | Kodialam | G06Q 30/02 707/733 |
| 2011/0292832 A1* | 12/2011 | Bottari | H04L 41/0896 370/254 |
| 2012/0203864 A1* | 8/2012 | Toth | H04L 41/12 709/217 |
| 2013/0103834 A1* | 4/2013 | Dzerve | H04L 67/10 709/225 |
| 2016/0119289 A1 | 4/2016 | Jain et al. | |

OTHER PUBLICATIONS

Bierman et al., "Entity MIB (Version 3)", Network Working Group, Request for Comments No. 4133, Aug. 2005, 62 pages.

Boschi et al., "IP Flow Anonymization Support", Internet Engineering Task Force, Request for Comments No. 6235, May 2011, 43 pages.

Cheshire et al., "NAT Port Mapping Protocol (NAT-PMP)", Independent Submission, Request for Comments No. 6886, Apr. 2013, 33 pages.

Fan et al., "Prefix-preserving IP address anonymization: measurement-based security evaluation and a new cryptography-based scheme", Computer Networks: The International Journal of Computer and Telecommunication Networking, vol. 46, No. 2, Oct. 2004, pp. 253-272.

Fuller et al., "Classless Inter-Domain Routing (CIDR): an Address Assignment and Aggregation Strategy", Network Working Group, Request for Comments No. 1519, Sep. 1993, 23 pages.

MacDonald et al., "NAT Behavior Discovery Using Session Traversal Utilities for NAT (STUN)", Internet Engineering Task Force, Request for Comments No. 5780, May 2010, 27 pages.

Srisuresh et al., "IP Network Address Translator (NAT) Terminology and Consideration", Network Working Group, Request for Comments No. 2663, Aug. 1999, 31 pages.

* cited by examiner

FIG. 3

NETWORK STATE TABLE 300

| NETWORK STATES (302) | NETWORK STATE NAMES (304) | NETWORK STATE DEFINITIONS (306) |
|---|---|---|
| 1 | INITIAL STATE | AT TIME OF DISCOVERY, NOT ENTERED IN NETWORK DATABASE |
| 2 | DISCOVERED-PROVISIONAL STATE | DISCOVERED AND ANONYMIZED, BUT BY POLICY LACKING ANY EMPIRICAL BASIS FOR SECURE ANONYMIZED NETWORK PREFIX IP ADDRESS RANGE ASSIGNMENT |
| 3 | SUBNET-FIXED STATE | EMPIRICAL ASSIGNMENT FOR SECURE ANONYMIZED NETWORK PREFIX IP ADDRESS RANGE BASED UPON GATEWAY CONFIGURATION OR ROUTE ANNOUNCEMENT DISCOVERY |
| 4 | SUBNET-ADJACENCY-ASSIGNED STATE | GATEWAY AND/OR ADDRESS TRANSLATION ASSIGNMENT TABLE INITIALIZED BASED UPON GATEWAY/ADDRESS TRANSLATION DISCOVERY, ROUTE ANNOUNCEMENT, OR PROTOCOL ANALYSIS |

Rows: 308, 310, 312, 314

IP ADDRESS
MAPPING TABLE
400

| UNANONYMIZED ADDRESS | ANONYMIZED ADDRESS | NETWORK ADDRESS | NETWORK STATE |
|---|---|---|---|
| 198.23.2.19 | 16.82.54.2 | 16.82.54.0/29 | SUBNET-FIXED |
| 198.23.2.27 | 16.82.54.30 | 16.82.54.0/29 | SUBNET-FIXED |
| 198.23.2.40 | 207.99.8.221 | 207.98.8.192/29 | DISCOVERED-PROVISIONAL |
| 198.23.2.103 | 13.73.62.39 | 13.73.62.32/29 | DISCOVERED-PROVISIONAL |

FIG. 4

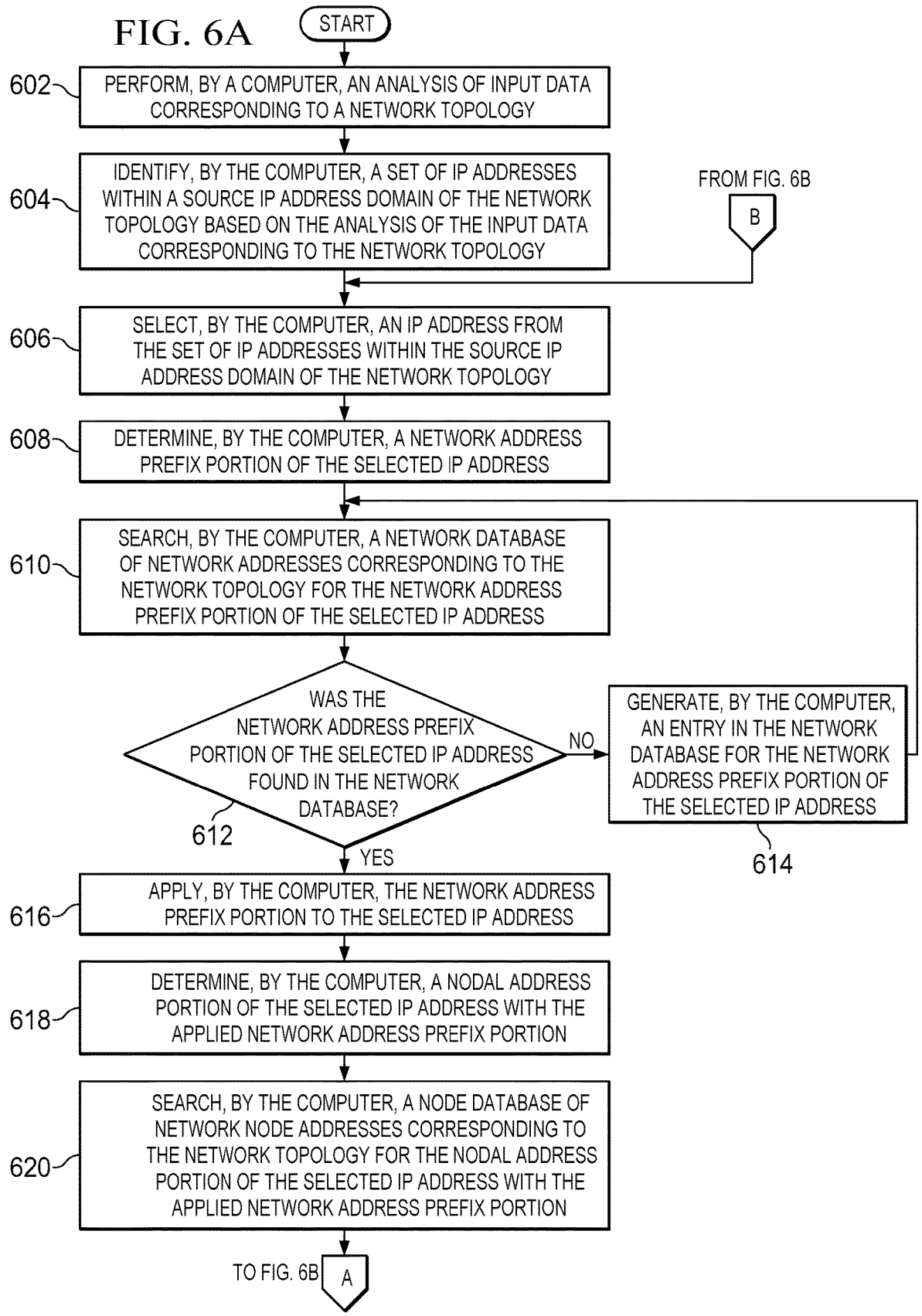

NETWORK TOPOLOGY-PRESERVING INTERNET PROTOCOL ADDRESS ANONYMIZATION

BACKGROUND

1. Field

The disclosure relates generally to internet protocol (IP) address anonymization and more specifically to anonymization of IP addresses in a network while preserving a topological structure of the network.

2. Description of the Related Art

Network packet traces, packet switching and routing device configurations, and network management application debug logs all can contain data constituting confidential IP network design and identifying nodal IP address information. Because these different types of data contain confidential information, it impedes these different types of data from being shared in scenarios such as product support, academic publication, and public judicial proceedings involving network forensic evidentiary information. Another use case for secure anonymization is the exporting and reporting of client network IP addresses to a provider, such as a managed security service provider (MSSP), where the provider's client requires obfuscation of the underlying network nodal endpoints and processor identities. Internet protocol address anonymization has been incorporated as an option into tcprewrite/tcpreplay on packet captures. In addition, techniques for processing of IP address anonymization have been used. These processes provide ways to anonymize and avoid recognizability of nodal endpoint IP addresses, along with identification of other packet switching "middleboxes" in data flows and packet captures.

However, these approaches act as processes for syntactic redaction of data based on address patterns matching internet protocol version 4 (IPv4) and version 6 (IPv6) addresses and host domain name system (DNS) names. Specifically, on any anonymized translation set of IP addresses, the target IP address domain will provide obfuscated translation from the source IP address domain to make the target IP address domain non-recognizable and non-reversible from the source IP address domain. In a number of intended applications, this meets the entire requirement set of the application.

In other applications, a need for preservation of a source network topology, while providing anonymization of the source of that network topology as represented in the source IP address domain, is essential. Examples include network product support and preservation of packet traces for presentation as evidence in judicial proceedings. In these cases, coordinated translation of an entire network topology, to a logically consistent output of a target IP address domain of the network topology, is an essential requirement.

SUMMARY

According to one illustrative embodiment, a computer-implemented method for anonymization of IP addresses of a network while preserving a topology of the network is provided. A computer receives information regarding a network topology. The computer analyzes the information to generate a first model of the network topology. The computer converts the first model into a second model preserving the network topology and obfuscating a mapping of the IP addresses. The computer utilizes the second model to simulate processing of network packets consistent with actual processing of the network packets in the network topology. According to other illustrative embodiments, a computer system and computer program product for anonymization of IP addresses of a network while preserving a topology of the network are provided.

Thus, illustrative embodiments perform iterative processing of network topology input data to achieve secure IP address anonymization, while preserving the topological structure of the network. In addition, illustrative embodiments perform stateful translation of networks for anonymization in such a way that a pre-anonymized form of a network retains consistency of source Classless Inter-Domain Routing (CIDR) IP address aggregation. Further, illustrative embodiments identify and preserve points of network address translation (NAT) and other non-routed open systems interconnection (OSI) model layer 3 address translation in anonymized network topology models.

BRIEF DESCRIPTION OF THE DRAWINGS

FIG. 3 is an example of a network table in accordance with an illustrative embodiment;

FIG. 4 is an example of an internet protocol address mapping table in accordance with an illustrative embodiment;

FIGS. 6A-6B are a flowchart illustrating a process for anonymization of internet protocol addresses while preserving network topology structure in accordance with an illustrative embodiment.

DETAILED DESCRIPTION

Figure 1:
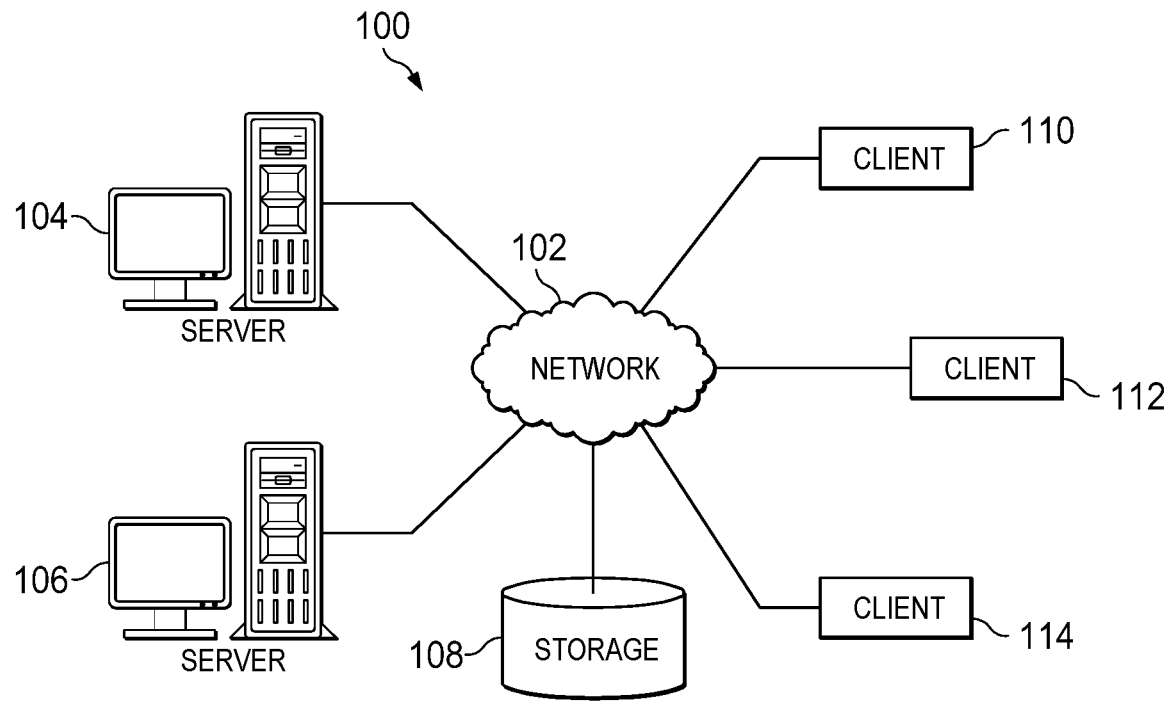
FIG. 1 is a pictorial representation of a network of data processing systems in which illustrative embodiments may be implemented.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD- ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
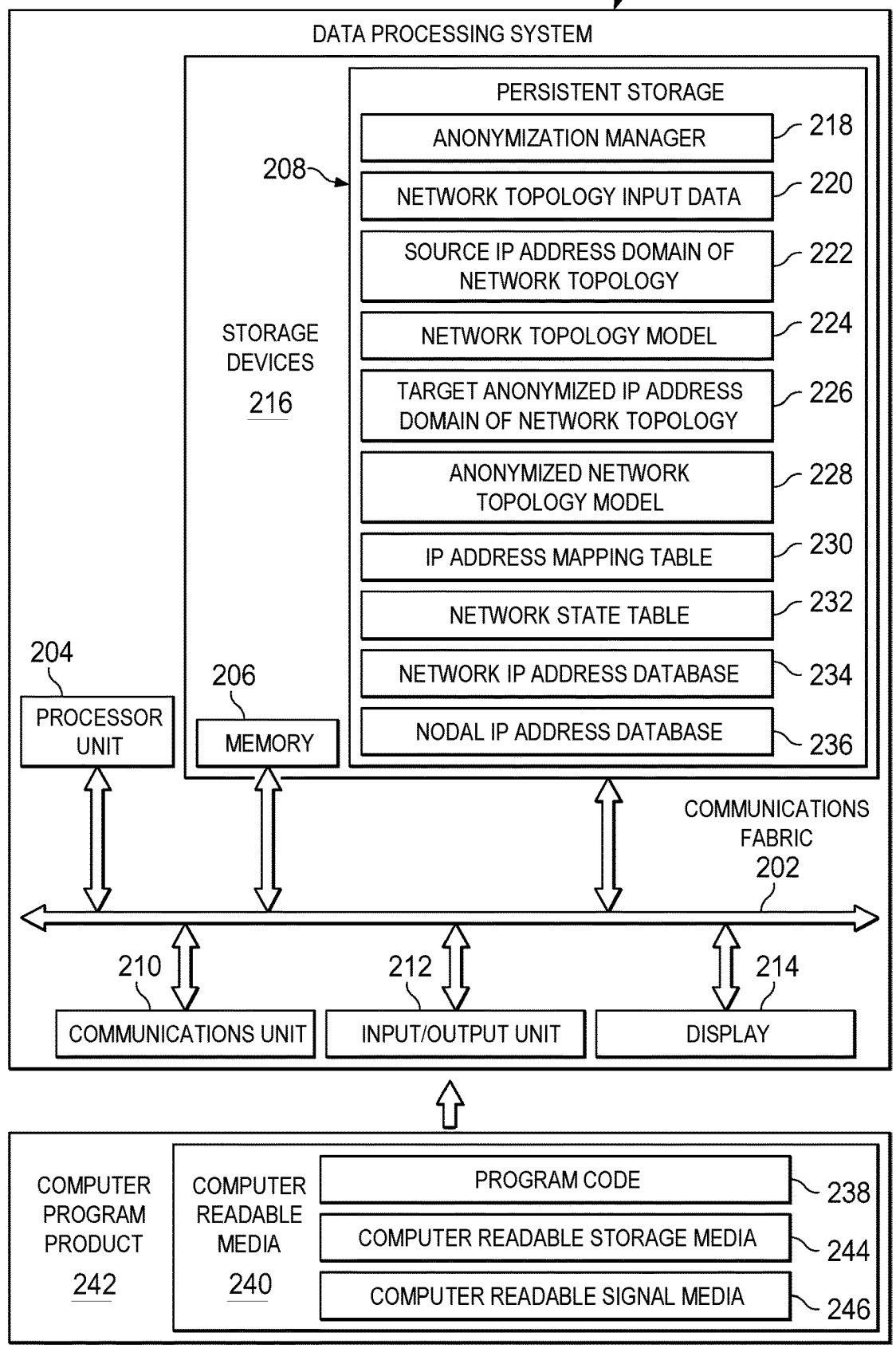
FIG. 2 is a diagram of a data processing system in which illustrative embodiments may be implemented.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102. Server 104 and server 106 may provide a set of one or more services to clients connected to network 102. For example, server 104 and/or server 106 may provide a set of network topology-preserving internet protocol (IP) network anonymization services to a set of one or more clients. Also, it should be noted that server 104 and server 106 may each represent a plurality of servers providing a plurality of network topology-preserving IP network anonymization services.

Client 110, client 112, and client 114 also connect to network 102. Clients 110, 112, and 114 are clients of server 104 and server 106. Further, server 104 and server 106 may provide information, such as software applications, to clients 110, 112, and 114.

In this example, clients 110, 112, and 114 each represent a network of computers and other devices. In addition, it should be noted that each of the networks corresponding to clients 110, 112, and 114 may include two or more subnetworks or subnets comprising different elements of an entire network. Users of clients 110, 112, and 114 may request the network topology-preserving IP network anonymization services provided by server 104 and server 106.

Storage 108 is a network storage device capable of storing any type of data in a structured format or an unstructured format. In addition, storage 108 may represent a set of one or more network storage devices. Storage 108 may store, for example, names and identification numbers for a plurality of different users; topology data corresponding to different networks; network topology models; anonymized network topology models; IP address mapping tables corresponding to different anonymized network topology models; and the like. Further, storage 108 may store other data, such as authentication or credential data that may include user names, passwords, and biometric data associated with users and system administrators, for example.

In addition, it should be noted that network data processing system 100 may include any number of additional servers, clients, and other devices not shown. Program code located in network data processing system 100 may be stored on a computer readable storage medium and downloaded to a computer or data processing system for use. For example, program code may be stored on a computer readable storage medium on server 104 and downloaded to client 110 over network 102 for use on client 110.

In the depicted example, network data processing system 100 may be implemented as a number of different types of communication networks, such as, for example, an internet, an intranet, a local area network (LAN), a wide area network (WAN), or any combination thereof. FIG. 1 is intended as an example, and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores anonymization manager 218. Anonymization manager 218 controls the process of anonymization of IP addresses in a network by allocating out of an open IP address range spanning a set of viable anonymized replacement IP addresses from octet to octet while preserving a topological structure of the network. It should be noted that even though anonymization manager 218 is illustrated as residing in persistent storage 208, in an alternative illustrative embodiment anonymization manager 218 may be a separate component of data processing system 200. For example, anonymization manager 218 may be a hardware component coupled to communication fabric 202 or a combination of hardware and software components. In another alternative illustrative embodiment, anonymization manager 218 may be located in a client, such as client 110 in FIG. 1. In a further alternative illustrative embodiment, a first set of components of anonymization manager 218 may be located in data processing system 200 and a second set of components of anonymization manager 218 may be located in a client.

Anonymization manager 218 receives network topology input data 220 from one or more data sources. Network topology input data 220 represent information corresponding to a particular network. Network topology input data 220 may include, for example, a topology document corresponding to the network, packet capture documents corresponding to the network, network router or other network traffic processing device configurations corresponding to the network, network flow reports, network management application debug log files corresponding to the network, and the like.

Anonymization manager 218 analyzes network topology input data 220 to determine source IP address domain of network topology 222. Source IP address domain of network topology 222 represents the IP address domain corresponding to the elements that comprise the topological structure of the network associated with network topology input data 220. After determining source IP address domain of network topology 222, anonymization manager 218 generates network topology model 224 based on source IP address domain of network topology 222. Network topology model 224 represents a model of the topological structure of the network associated with network topology input data 220.

Anonymization manager 218 also generates target anonymized IP address domain of network topology 226 by allocating out of the open IP address range spanning the set of viable anonymized replacement IP addresses from octet to octet. Target anonymized IP address domain of network topology 226 represents the translated or obfuscated IP addresses corresponding to source IP address domain of network topology 222. Further, anonymization manager 218 generates anonymized network topology model 228 based on target anonymized IP address domain of network topology 226. Anonymized network topology model 228 represents an anonymized model of the topological structure of the network associated with network topology input data 220.

Furthermore, anonymization manager 218 generates IP address mapping table 230. Internet protocol address mapping table 230 represents a mapping of real IP addresses corresponding to source IP address domain of network topology 222 with the anonymized IP addresses corresponding to target anonymized IP address domain of network topology 226. Anonymization manager 218 utilizes IP address mapping table 230 to translate anonymized IP addresses to real IP addresses corresponding to the different elements of the network topology.

Moreover, anonymization manager 218 generates network state table 232. Network state table 232 represents a table that contains definitions for a plurality of different possible states of a network. Anonymization manager 218 may utilize the definitions in network state table 232 to determine a current state of a network. The current state of a network may be, for example, an initial state, a discovered-provisional state, a subnet-fixed state, or a subnet-adjacency-assigned state. After determining the current state of the network, anonymization manager 218 may include the current state of the network in IP address mapping table 230.

In this example, persistent storage also stores network IP address database 234 and nodal IP address database 236. However, it should be noted that network IP address database 234 and nodal IP address database 236 may be stored in one or more local or remote storage devices, such as storage 108 in FIG. 1. Network IP address database 234 represents a listing of network prefixes corresponding to different networks and their respective subnets. Network IP address database 234 may be, for example, keyed by network address prefixes. Nodal IP address database 236 represents a listing of nodal IP addresses corresponding to the different networks and subnets. Anonymization manager 218 may utilize network IP address database 234 and nodal IP address database 236 to identify the different networks and subnets, along with their respective nodal elements.

Communications unit 210, in this example, provides for communication with other networks, computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (WiFi), bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keyboard, keypad, or some other suitable input device. Display 214 provides a mechanism to display information to a user and may include touch screen capabilities to allow the user to make on-screen selections through user interfaces or input data, for example. For example, anonymization manager 218 may display anonymized network topology model 228 on display 214 for a user of data processing system 200 to review.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer-implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 238 is located in a functional form on computer readable media 240 that is selectively removable and may be loaded onto or transferred to data processing system 200 for running by processor unit 204. Program code 238 and computer readable media 240 form computer program product 242. In one example, computer readable media 240 may be computer readable storage media 244 or computer readable signal media 246. Computer readable storage media 244 may include, for example, an optical or magnetic disc that is inserted or placed into a drive or other device that is part of persistent storage 208 for transfer onto a storage device, such as a hard drive, that is part of persistent storage 208. Computer readable storage media 244 also may take the form of a persistent storage, such as a hard drive, a thumb drive, or a flash memory that is connected to data processing system 200. In some instances, computer readable storage media 244 may not be removable from data processing system 200.

Alternatively, program code 238 may be transferred to data processing system 200 using computer readable signal media 246. Computer readable signal media 246 may be, for example, a propagated data signal containing program code 238. For example, computer readable signal media 246 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 238 may be downloaded over a network to persistent storage 208 from another device or data processing system through computer readable signal media 246 for use within data processing system 200. For instance, program code stored in a computer readable storage media in a data processing system may be downloaded over a network from the data processing system to data processing system 200. The data processing system providing program code 238 may be a server computer, a client computer, or some other device capable of storing and transmitting program code 238.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 244 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Secure anonymization of network IP address data is an increasing requirement for product support, network reporting, and client to provider identification of underlying managed networks. However, current techniques do not provide capabilities for secure preservation of the underlying network topology structure. This capability of securely preserving the underlying network topology structure of a source IP address domain is valuable for being able to impose traversal, reachability, simulation, and other processes over the securely anonymized IP address data.

Illustrative embodiments meet that requirement in a secure fashion across a number of complicating variations that may show up in the source IP address domain of the network topology. The end result of processes of illustrative embodiments is not so much IP address anonymization, but is a network topology-preserving IP network anonymization, which is a comprehensive post-anonymized and translated target network topology model as output. In other words, illustrative embodiments are capable of anonymization of IP addresses in a network without changing a topological structure of the network (e.g., maintaining relationships between elements of the network and preserving the integrity of the topology in the model).

Illustrative embodiments perform iterative processing of network topology input data to achieve secure IP address anonymization, while specifically preserving the topological structure of the network. In addition, illustrative embodiments perform stateful translation of networks for anonymization in such a way that a pre-anonymized form of a network retains consistency of Classless Inter-Domain Routing (CIDR) source IP address domain aggregation. Further, illustrative embodiments identify and preserve points of network address translation (NAT) (e.g., NAT gateway servers) and other non-routed open systems interconnection (OSI) model layer 3 address translation, such as tunnel identification, in target anonymized network topology models.

Illustrative embodiments receive a set of one or more input documents describing nodal elements of a network topology. The set of input documents may include, for example, network router or other traffic processing device configurations, data packet capture documents and repositories, network protocol-conveyed flow reports, and the like. Illustrative embodiments may introduce these input documents, which describe the source IP address domain of the network topology, across iterative execution or invocation steps. Further, illustrative embodiments do not require that these input documents be homogeneous in origin with regard to document type. Furthermore, illustrative embodiments provide the state of any given source IP address domain under evaluation for network topology anonymization in the form of a secure data store or database, which enables structured key/value associations. This data store and its corresponding state provides the current values for mappings of network addresses by network prefix and decimal values and the current identification of gateways between network element aggregations by target anonymized IP address domain and gateway type in the target anonymized network topology model. Optionally, this data store also may provide mappings of a domain name system (DNS) domain for DNS-addressed network elements and other configuration elements in the target anonymized network topology model.

Illustrative embodiments are concerned with the preservation of network topological structure of the described and anonymized network topology of the source IP address domain. A network traffic path that is viable from one nodal element to a gateway corresponding to that nodal element, to another gateway corresponding to another nodal element, and then to that other nodal element (e.g., $N(a) \Rightarrow N_g(a) \Rightarrow N_g(b) \Rightarrow N(b)$) should have a corresponding network traffic path in the target anonymized network topology model representing, one-to-one in its network traffic pathing composition, a viable nodal traffic path from one anonymized nodal element to an anonymized gateway corresponding to that anonymized nodal element, to another anonymized gateway corresponding to another anonymized nodal element, and then to that other anonymized nodal element (e.g., $N(a)^A \Rightarrow N_g^A(a) \Rightarrow N_g^A(b) \Rightarrow N^A(b)$) for the target anonymized network topology model.

As a further measure of practicality, the anonymization process strives to interpret the elevation of a nodal element to a gateway node ($N_g$) along a number of different relevant functional criteria, affecting network traffic path and IP address translation of network traffic traversing that path within the network topology. In particular, one interpretation of "gateway" as being one-for-one with OSI model layer 3 link-state or a distance-vector router is an insufficient abstraction in modern enterprise and carrier networks. At the very least, recognizing the pervasive deployment of NAT and dynamic host configuration servers as repositories of IP addressing information for network elements and network traffic paths within their respective IP address domains, illustrative embodiments represent these NAT and dynamic host configuration servers in the secure data store with their own topologically-consistent nodal IP addresses. However, it should be noted that a dynamic host configuration server have no relationship to the notion of "gateway" even in the broadest of interpretations.

As an operational overview, illustrative embodiments take as input, for example, a document of a network topology, set of packets, network traffic routing device configuration data with node IP address, or configured static routing tables. In addition, illustrative embodiments may take as input a previously assembled network topology model of a securely anonymized network topology, which is based on a prior analysis of other input documents, packet traces, or network traffic routing device configuration data.

As illustrative embodiments analyze the input data, elements of the network (i.e., nodes and their contained interfaces) are identified producing a combination of: 1) a network topology model of a source domain of IP addresses based upon the input data, including network, gateway, and packet route details, along with areas of identification for dynamic NAT; and 2) an adaptive anonymization for the OSI model layer 3 and resource naming details of the elements of that network topology so addressable/accessible as names instead of layer 3 IP addresses. These identified network elements either augment or constitute an output network topology model, along with the secure data store entries that represent the mapping and translation of IP addresses at the node and overall network levels.

Illustrative embodiments may further augment this set of document and secure data store outputs by contributions from later executions of the network topology-preserving IP network anonymization process and its topological mapping algorithms. It is an operational intention of the network topology-preserving IP network anonymization process to have as an output a target anonymized network topology model, which has none of the input data associatively describing the current subnet associations and current state of the target anonymized network topology model, as being the only thing published to consumers of the secure data. In other words, no elements of non-anonymized network IP addressing should be available to a publishing provider, such as a support organization, MSSP, and the like.

Illustrative embodiments first encounter a network topology in a "pre-anonymized" network topology model through analysis of input data corresponding to a source IP address domain and inserting a nodal IP address entry into a nodal IP address database. If that nodal IP address entry does not match any subnet prefix addresses currently maintained in the network IP address database, then illustrative embodiments generate an entry for that subnet prefix of the nodal IP address, with an initial attempt at subnet prefix range resolution based on a fixed policy. For example, the policy may assume that all undiscovered subnets are /24 (i.e., the suffix of the IP address indicates that the number of bits of the subnet prefix in the IP address is 24). Alternatively, illustrative embodiments may modify the policy based on nodal IP address range or class of device whose configuration is being analyzed by illustrative embodiments if that is where illustrative embodiments derive the input data from. Illustrative embodiments then insert that subnet prefix entry into the network IP address database.

Illustrative embodiments perform IP address anonymization by allocating out of an IP address range spanning a set of viable anonymized IP address replacements from octet to octet. Illustrative embodiments limit leading octets in an IP address to decimal values 11-223. Outside of that, illustrative embodiments subtract the class B decimal values 172.16.0.0/16 and 192.168.0.0/16 from the anonymized mapping space in deference to Request For Comments (RFC) 1918, which is IP address allocation for private internets. At any time, the allocation from this IP address pool can be considered as a contiguous range of IP addresses, which is suitable for allocation of IP addresses that are not already associated with a discovered subnet. In other words, anonymous mapping of a subnet to 133.5.6.0/23 provides a contiguous and allocatable IP address range of 133.5.8.0 anywhere else in the network topology model. This IP address range is not just topologically "contiguous" as might be a rational IP address allocation policy if this IP address range is assigned in a designed enterprise network and not as a product of IP address anonymization mapping. At any time, therefore, a network in that network IP address database can be in any of several states (See the network state table example in FIG. 3).

Discovery of gateways allows network state advancement beyond a discovered-provisional network state. Illustrative embodiments may introduce gateways into a network topology model through one of several ways in terms of processing network topology input data. For example, if the configuration of a node supporting logically multihomed IP interface configurations is introduced into the network topology model, and the configuration reflects the presence of processes for static, distance-vector, or link-state routing (i.e., interior gateway routing) across those interfaces, then illustrative embodiments identify that node as a gateway. Networks in a static configuration for these processes, and the routing tables for the overall system become subnet-fixed, as the definition of those networks is authoritative. This then commences a pruning and reassignment process, which is described below.

It should be noted that illustrative embodiments do not differentiate anonymized network representations based on identifying the routing protocol carrying the data on the network in the topological model. If the configuration of a non-mulithomed node, as introduced into the network topology model as input, does reflect an identification of a default gateway and a network prefix length, then the network becomes subnet-fixed with: a) a single interface attachment from the discovered node; and b) a single logical interface attachment of a gateway to that same network. It should be noted that a fulfillment of the assembling of the network topology model through subsequent input of a gateway, as described above, will be the only way to resolve multiple gateway attached networks to the same logical gateway containment, which is a subnet-adjacency alignment between adjacent subnets.

The two mechanisms discussed above are nonexclusive with respect to another kind of input to the network topology model, which traces live network traffic with IP address information. In this case, consistent with IP host forwarding, network traffic that accumulates multiple IP destination addresses to the same OSI model layer 2 address is presumed to be a gateway at that address. Illustrative embodiments assign a discovered-provisional network state to that IP address (assuming that the network is not already present as discovered-provisional or subnet-fixed in the network topology model) and illustrative embodiments assign a special internal decimal value to the gateway, itself. Other types of network traffic, such as, for example, Internet Control Message Protocol traffic, which reflects that an OSI model layer 2 source address can be presumed to reflect a source address of a gateway and its associated logical interface on that subnet. This is how illustrative embodiments may assemble an entire network topology using live network packet trace input over time.

It should be noted that "address" in the discussion above is entirely referent to a pre-anonymized or real IP address. At the point where illustrative embodiments assign a subnet-fixed state to a network, it is possible and even expected that the network is present as discovered-provisional using a different subnet definition. At the point where illustrative embodiments advance a network address to subnet-fixed, illustrative embodiments analyze all current discovered-provisional networks to see if the now-fixed network address should replace the discovered-provisional network address.

If all of the network elements of a previously discovered-provisional network address do not have their known logical interface addresses fall within the IP address range of the subnet-fixed network, then illustrative embodiments allocate one or more new discovered-provisional networks to contain the outlier IP addresses. For example, if illustrative embodiments find a single 198.23.2.0/24 address as a discovered-provisional network, based upon the nodal discovery of IP addresses 198.23.2.19, 198.23.2.27, 198.23.2.40, and 198.23.2.103, then illustrative embodiments may discover the configuration of an open shortest path first process (e.g., a link-state routing protocol) with a network address of 198.23.2.0/29 and an anonymized network address of 16.82.54.0/24. This then causes reassignment of this part of the IP address in the network topology model as shown in the IP address mapping table example of FIG. 4. It should be noted that illustrative embodiments generate an anonymized IP address from portions of IP addresses in the nodal IP address database and the network IP address database.

In the example of FIG. 4, the last two networks have been "reallocated" out of unallocated network space for discovered-provisional networks. This example shows an anonymized randomization assignment to non-contiguous network IP address ranges to illustrate the lack of contiguity between the "other" seven networks in the pre-anonymized /29 network prefix address space. To that extent, the "other" seven networks in the previously discovered-provisional secure anonymized IP address mapping of 16.82.54.x/29 (i.e., x={32, 64, 96, 128, 160, 192, 224}) represent non-aggregatable open and assignable secure anonymized network IP address mappings in the managed network prefix address space. It should be noted that illustrative embodiments avoid any tendency toward anonymized network IP address assignment that tends toward aggregation of IP addressses, which degrades the secure non-detectability of the anonymized IP address translation. The process by which illustrative embodiments incrementally assemble a target anonymized network topology model from network topology input data, such as network traffic routing device configurations and live network traffic snapshots, and the dynamic nature of the resulting anonymized network topology model, provides a unique capability to securely anonymize across NAT deployment points (e.g., NAT gateway servers).

With reference now to FIG. 3, an example of a network table is depicted in accordance with an illustrative embodiment. Network state table 300 may be, for example, network state table 232 in FIG. 2. Network state table 300 includes definitions for a plurality of different states of a network.

In this example, network state table 300 includes network states 302, network state names 304, and network state definitions 306. Also in this example, network state 1 308 is an initial state of a network at time of discovery, but the network is not entered in a network database, such as network IP address database 234 in FIG. 2. Network state 2 310 is a discovered-provisional state of a network. In the discovered-provisional state, the network is discovered and anonymized, but by policy the network is lacking any basis for secure anonymized network prefix IP address range assignment. Network state 3 312 is a subnet-fixed state of a network. In the subnet-fixed state, the network has secure anonymized network prefix IP address range assignment based on gateway configuration data or packet route discovery. Network state 4 314 is a subnet-adjacency-assigned state of a network. In the subnet-adjacency-assigned state, the network's gateway and/or address translation assignment table, such as IP address mapping table 230 in FIG. 2, is initialized based on gateway/address translation discovery, packet route discovery, or protocol analysis.

With reference now to FIG. 4, an example of an IP address mapping table is depicted in accordance with an illustrative embodiment. Internet protocol address mapping table 400 may be, for example, IP address mapping table 230 in FIG. 2. In this example, IP address mapping table 400 includes unanonymized address 402, anonymized address 404, network address 406, and network state 408. Unanonymized address 402 represents a real address of a network element, such as a node and its interface. Anonymized address 404 represents the anonymized or obfuscated IP address corresponding to unanonymized address 402. Network address 406 identifies the network prefix portion of anonymized address 404. Network state 408 identifies the current state of the network.

Also in this example, entry 410 includes an unanonymized IP address of 198.23.2.19, an anonymized IP address of 16.82.54.2, a network IP address of 16.82.54.0/29, and a current network state of subnet-fixed. Entry 412 includes an unanonymized IP address of 198.23.2.27, an anonymized IP address of 16.82.54.30, a network IP address of 16.82.54.0/29, and a current network state of subnet-fixed. Entry 414 includes an unanonymized IP address of 198.23.2.40, an anonymized IP address of 207.99.8.221, a network IP address of 207.99.8.192/29, and a current network state of discovered-provisional. Entry 416 includes an unanonymized IP address of 198.23.2.103, an anonymized IP address of 13.73.62.39, a network IP address of 13.73.62.32/29, and a current network state of discovered-provisional.

Figure 5:
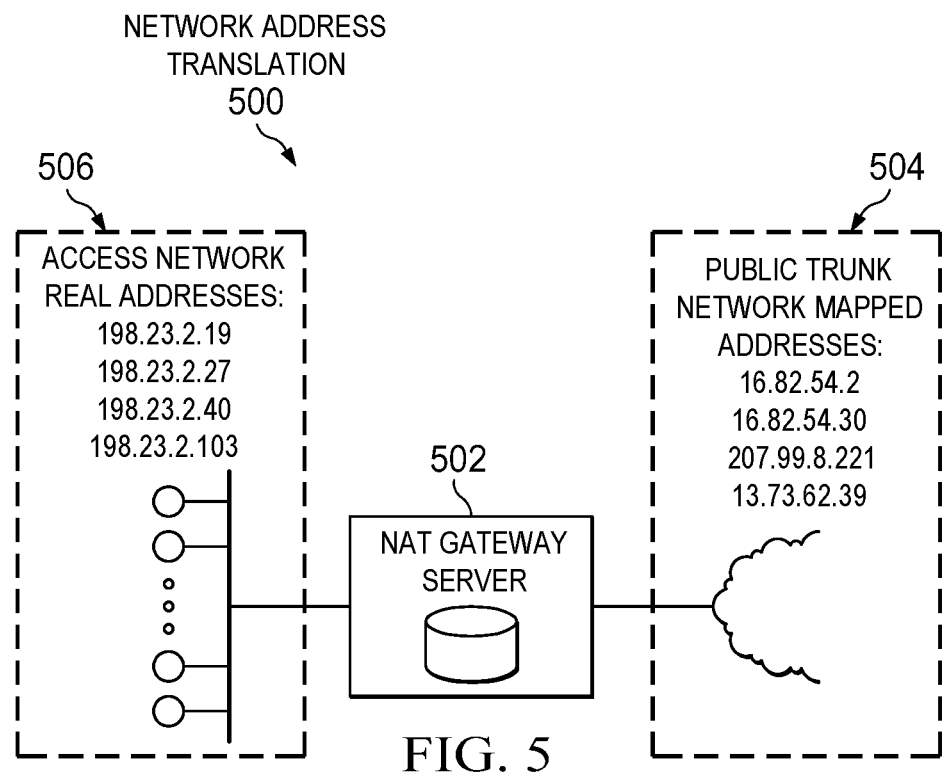
FIG. 5 is an example of network address translation in accordance with an illustrative embodiment.

With reference now to FIG. 5, an example of network address translation is depicted in accordance with an illustrative embodiment. Network address translation 500 includes NAT gateway server 502, public trunk network 504 with mapped addresses, and access network 506 with real addresses. Network address translation server 502 performs the IP address translation between public trunk network 504 having the mapped or anonymized IP addresses, such as anonymized addresses 404 in FIG. 4, and access network 506 having the real or unanonymized IP addresses, such as unanonymized addresses 402 in FIG. 4.

In network configurations, the IP address pools and assignment policies for mapped translation IP addresses and service endpoint ports are identified within the policy configuration corresponding to NAT gateway server 502, which implements the IP address translation and maintains the state of translated IP addresses. A secure strategy may be, for example, the one-to-one assignment of unallocated secure anonymized-translation IP addresses at a point where static NAT is being imposed.

As NAT is a form of non-secure deterministic IP address anonymization, such as packet tunneling that equates in terms of network detection to a kind of one-to-one translation that is present in static NAT, a remaining task is to detect it from the network topology data input of network packet traffic. That is, the dynamic NAT function may be visualized as follows, in an effort to detect it and to properly and securely anonymize its mapped network IP addresses. This may reflect the state of the target anonymized network topology model, which is assembled through network packet capture, at some point in time.

A viable heuristic for determining NAT gateway server 502's "internal" nature of the mapped IP addresses is to note that as represented on public trunk network 504's side of NAT gateway server 502, these mapped IP addresses do not correspond to any nodes mapped from access network 506 or any other access network. In fact, the mapped IP address range may be native to nodes assigned to public-space addresses. This means that the mapped IP addresses either correspond to a mapping range or are deliberately mapped addresses for services internal to NAT gateway server 502, itself. The latter scenario is not of interest to the anonymization process of illustrative embodiments. Upon detection of IP addresses associated with active NAT mappings, illustrative embodiments may enter the mapped IP addresses as limited discovered-provisional addresses. Afterward, the mapped IP addresses may go through the process of secure anonymization. As a result, the exact access network IP address range being used by illustrative embodiments as the real IP address side of the translation mapping may not be detectable.

For any inferential system for network topology inference (e.g., network auto-discovery by a network management system and inventory control applications), transient trade-offs exist for how illustrative embodiments employ these kinds of heuristics. For example, the identification and object placement of NAT translation in a network topology model is one measure of a current confidence interval. As illustrative embodiments assemble the network topology model based on data inputs of network traffic as seen from both sides of NAT gateway 502 that is making use of the IP address translation, illustrative embodiments may better detect and cross-reference patterns, which may increase the current confidence interval. In addition, it bears restating, that the size of the mapped IP address range and the address allocation policy are not detectable in any sort of policy announcements, such as routing announcements. This means that the liability for reallocation and aggregation of mapped networks in anonymized translation must be accounted for as illustrative embodiments assemble the network topology model.

Figure 6B:
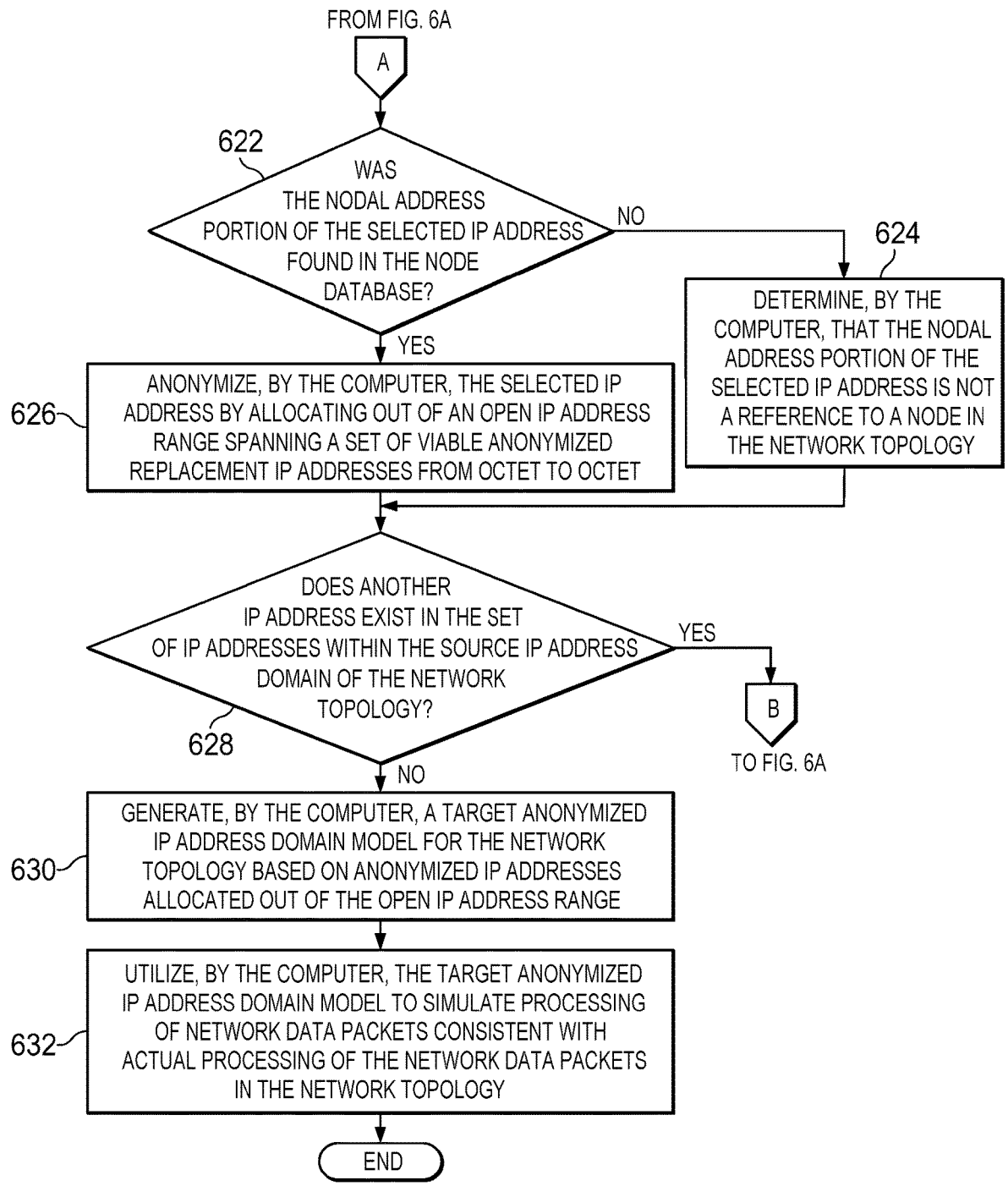

With reference now to FIGS. 6A-6B, a flowchart illustrating a process for anonymization of IP addresses while preserving network topology structure is shown in accordance with an illustrative embodiment. The process shown in FIGS. 6A-6B may be implemented in a computer, such as, for example, server 104 in FIG. 1.

The process begins when the computer performs an analysis of input data corresponding to a network topology (step 602). The input data corresponding to the network topology may be, for example, network topology input data 220 in FIG. 2. Afterward, the computer identifies a set of IP addresses within a source IP address domain of the network topology based on the analysis of the input data corresponding to the network topology (step 604). The set of IP addresses within the source IP address domain of the network topology may be, for example, source IP address domain of network topology 222 in FIG. 2.

Then, the computer selects an IP address from the set of IP addresses within the source IP address domain of the network topology (step 606). In addition, the computer determines a network address prefix portion of the selected IP address (step 608). Further, the computer searches a network database of network addresses corresponding to the network topology for the network address prefix portion of the selected IP address (step 610). The network database of network addresses corresponding to the network topology may be, for example, network IP address database 234 in FIG. 2.

Subsequently, the computer makes a determination as to whether the network address prefix portion of the selected IP address was found in the network database (step 612). If the computer determines that the network address prefix portion of the selected IP address was not found in the network database, no output of step 612, then the computer generates an entry in the network database for the network address prefix portion of the selected IP address (step 614). Thereafter, the process returns to step 610 where the computer once again searches the network database of network addresses for the network address prefix portion of the selected IP address. If the computer determines that the network address prefix portion of the selected IP address was found in the network database, yes output of step 612, then the computer applies the network address prefix portion to the selected IP address (step 616).

Afterward, the computer determines a nodal address portion of the selected IP address with the applied network address prefix portion (step 618). In addition, the computer searches a node database of network node addresses corresponding to the network topology for the nodal address portion of the selected IP address with the applied network address prefix portion (step 620). The node database of network node addresses corresponding to the network topology may be, for example, nodal IP address database 236 in FIG. 2. Subsequently, the computer makes a determination as to whether the nodal address portion of the selected IP address was found in the node database (step 622).

If the computer determines that the nodal address portion of the selected IP address was not found in the node database, no output of step 622, then the computer determines that the nodal address portion of the selected IP address is not a reference to a node in the network topology (step 624). Thereafter, the process proceeds to step 628. If the computer determines that the nodal address portion of the selected IP address was found in the node database, yes output of step 622, then the computer anonymizes the selected IP address by allocating out of an open IP address range spanning a set of viable anonymized replacement IP addresses from octet to octet (step 626).

Afterward, the computer makes a determination as to whether another IP address exists in the set of IP addresses within the source IP address domain of the network topology (step 628). If the computer determines that another IP address does exist in the set of IP addresses within the source IP address domain of the network topology, yes output of step 628, then the process returns to step 606 where the computer selects another IP address from the set of IP addresses. If the computer determines that another IP address does not exist in the set of IP addresses within the source IP address domain of the network topology, no output of step 628, then the computer generates a target anonymized IP address domain model for the network topology based on anonymized IP addresses allocated out of the open IP address range (step 630). The target anonymized IP address domain model for the network topology may be, for example, target anonymized IP address domain of network topology 226 in FIG. 2. Further, the computer utilizes the target anonymized IP address domain model to simulate processing of network data packets consistent with actual processing of the network data packets in the network topology (step 632). The computer also may add the target anonymized IP address domain model to an automated test suite. Furthermore, the computer may utilizes the target anonymized IP address domain model to, for example, determine whether sufficient resources exist within the network, trouble-shoot identified problems with the network, or identify security issues within the network. Thereafter, the process terminates.

Figure 7:
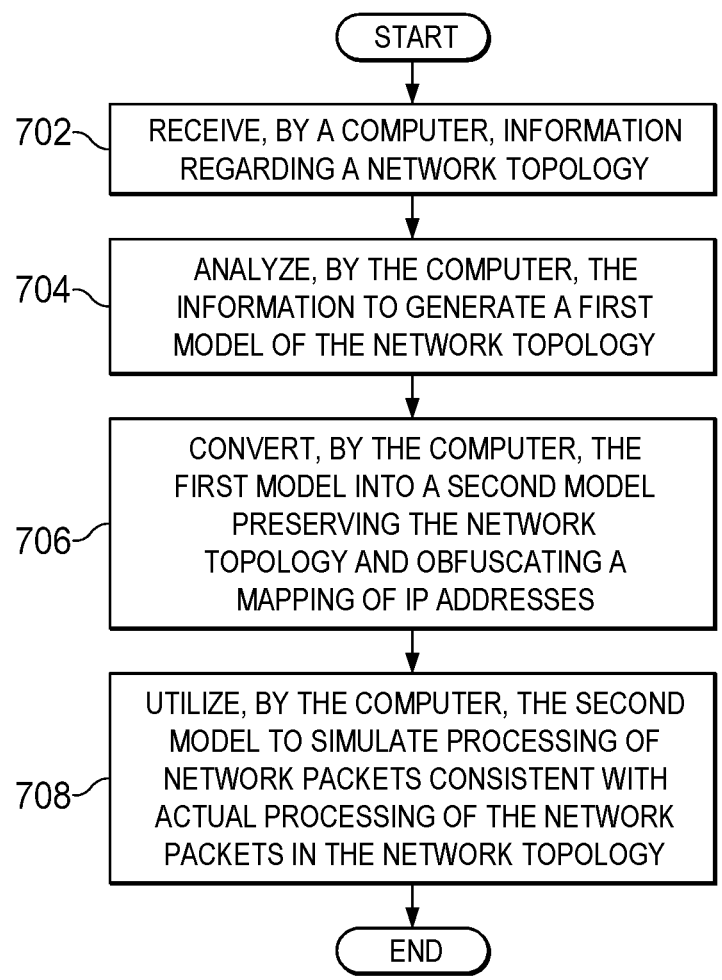
FIG. 7 is a flowchart illustrating a process for converting a first network topology model into a second network topology model while preserving a network topology of a network and obscuring a mapping of internet protocol addresses in accordance with an illustrative embodiment.

With reference now to FIG. 7, a flowchart illustrating a process for converting a first network topology model into a second network topology model while preserving a network topology of a network and obscuring a mapping of IP addresses is shown in accordance with an illustrative embodiment. The process shown in FIG. 7 may be implemented in a computer, such as, for example, server 104 in FIG. 1.

The process begins when the computer receives information regarding a network topology (step 702). The computer analyzes the information to generate a first model of the network topology (step 704). In addition, the computer converts the first model into a second model preserving the network topology and obfuscating a mapping of IP addresses (step 706). Then, the computer utilizes the second model to simulate processing of network packets consistent with actual processing of the network packets in the network topology (step 708). Thereafter, the process terminates.

Thus, illustrative embodiments of the present invention provide a computer-implemented method, computer system, and computer program product for anonymization of IP addresses of a network while preserving a topology of the network. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for anonymization of IP addresses of a network while preserving a topology of the network, the computer-implemented method comprising:
   receiving, by a computer, information regarding a network topology;
   analyzing, by the computer, the information to generate a first model of the network topology;
   converting, by the computer, the first model into a second model preserving the network topology and obfuscating a mapping of the IP addresses; and
   utilizing, by the computer, the second model to simulate processing of network packets consistent with actual processing of the network packets in the network topology.

2. The computer-implemented method of claim 1 wherein preserving the network topology comprises preserving the network topology in the second model when converting the first model into the second model, and further comprising:
   performing, by the computer, an analysis of input data corresponding to the network topology; and
   identifying, by the computer, a set of IP addresses within a source IP address domain of the network topology based on the analysis of the input data corresponding to the network topology.

3. The computer-implemented method of claim 2 further comprising:
   selecting, by the computer, an IP address from the set of IP addresses within the source IP address domain of the network topology;
   determining, by the computer, a network address prefix portion of the selected IP address selected from the set of IP addresses within the source IP address domain of the network topology; and
   searching, by the computer, a network database of network addresses corresponding to the network topology for the network address prefix portion of the selected IP address.

4. The computer-implemented method of claim 3 further comprising:
   determining, by the computer, whether the network address prefix portion of the selected IP address is in the network database; and
   responsive to the computer determining that the network address prefix portion of the selected IP address is not in the network database, generating, by the computer, an entry in the network database for the network address prefix portion of the selected IP address.

5. The computer-implemented method of claim 4 further comprising:
   responsive to the computer determining that the network address prefix portion of the selected IP address is in the network database, applying, by the computer, the network address prefix portion to the selected IP address.

6. The computer-implemented method of claim 3 further comprising:
   determining, by the computer, a nodal address portion of the selected IP address; and
   searching, by the computer, a node database of network node addresses corresponding to the network topology for the nodal address portion of the selected IP address.

7. The computer-implemented method of claim 6 further comprising:
   determining, by the computer, whether the nodal address portion of the selected IP address was found in the node database; and
   responsive to the computer determining that the nodal address portion of the selected IP address is not in the node database, determining, by the computer, that the nodal address portion of the selected IP address is not a reference to a node in the network topology.

8. The computer-implemented method of claim 7 further comprising:
   responsive to the computer determining that the nodal address portion of the selected IP address is in the node database, anonymizing, by the computer, the selected IP address by allocating out of an open IP address range spanning a set of viable anonymized replacement IP addresses from octet to octet while preserving the network topology.

9. The computer-implemented method of claim 8 further comprising:
   generating, by the computer, a target anonymized IP address domain model for the network topology based on anonymized IP addresses allocated out of the open IP address range spanning the set of viable anonymized replacement IP addresses.

10. The computer-implemented method of claim 1, wherein the second model retains consistency of source Classless Inter-Domain Routing, retains source IP addressing aggregation, preserves points of network address translation, and preserves non-routed OSI model layer 3 address translation in the mapping of the IP addresses.

11. A computer system for anonymization of IP addresses of a network while preserving a topology of the network, the computer system comprising: a bus system; a storage device connected to the bus system, wherein the storage device stores program instructions; and a processor connected to the bus system, wherein the processor executes the program instructions to:
receive information regarding a network topology;
analyze the information to generate a first model of the network topology;
convert the first model into a second model while preserving the network topology and obfuscating a mapping of the IP addresses; and
utilize the second model to simulate processing of network packets consistent with actual processing of the network packets in the network topology.

12. The computer system of claim 11, wherein preserving the network topology comprises preserving the network topology in the second model when converting the first model into the second model, and wherein the processor further executes the program instructions to:
perform an analysis of input data corresponding to the network topology; and
identify a set of IP addresses within a source IP address domain of the network topology based on the analysis of the input data corresponding to the network topology.

13. The computer system of claim 12, wherein the processor further executes the program instructions to:
select an IP address from the set of IP addresses within the source IP address domain of the network topology;
determine a network address prefix portion of the selected IP address selected from the set of IP addresses within the source IP address domain of the network topology; and
search a network database of network addresses corresponding to the network topology for the network address prefix portion of the selected IP address.

14. The computer system of claim 13, wherein the processor further executes the program instructions to:
determine whether the network address prefix portion of the selected IP address is in the network database; and
generate an entry in the network database for the network address prefix portion of the selected IP address in response to determining that the network address prefix portion of the selected IP address is not in the network database.

15. The computer system of claim 14, wherein the processor further executes the program instructions to:
apply the network address prefix portion to the selected IP address in response to determining that the network address prefix portion of the selected IP address is in the network database.

16. A computer program product for anonymization of IP addresses of a network while preserving a topology of the network, the computer program product comprising a computer readable storage medium having program instructions embodied therewith, the program instructions executable by a computer to cause the computer to perform a method comprising:
receiving, by the computer, information regarding a network topology;
analyzing, by the computer, the information to generate a first model of the network topology;
converting, by the computer, the first model into a second model while preserving the network topology and obfuscating a mapping of the IP addresses; and
utilizing, by the computer, the second model to simulate processing of network packets consistent with actual processing of the network packets in the network topology.

17. The computer program product of claim 16 wherein preserving the network topology comprises preserving the network topology in the second model when converting the first model into the second model, and further comprising:
performing, by the computer, an analysis of input data corresponding to the network topology; and
identifying, by the computer, a set of IP addresses within a source IP address domain of the network topology based on the analysis of the input data corresponding to the network topology.

18. The computer program product of claim 17 further comprising:
selecting, by the computer, an IP address from the set of IP addresses within the source IP address domain of the network topology;
determining, by the computer, a network address prefix portion of the selected IP address selected from the set of IP addresses within the source IP address domain of the network topology; and
searching, by the computer, a network database of network addresses corresponding to the network topology for the network address prefix portion of the selected IP address.

19. The computer program product of claim 18 further comprising:
determining, by the computer, whether the network address prefix portion of the selected IP address is in the network database; and
responsive to the computer determining that the network address prefix portion of the selected IP address is not in the network database, generating, by the computer, an entry in the network database for the network address prefix portion of the selected IP address.

20. The computer program product of claim 19 further comprising:
responsive to the computer determining that the network address prefix portion of the selected IP address is in the network database, applying, by the computer, the network address prefix portion to the selected IP address.

21. The computer program product of claim 18 further comprising:
determining, by the computer, a nodal address portion of the selected IP address; and
searching, by the computer, a node database of network node addresses corresponding to the network topology for the nodal address portion of the selected IP address.

22. The computer program product of claim 21 further comprising:
determining, by the computer, whether the nodal address portion of the selected IP address was found in the node database; and
responsive to the computer determining that the nodal address portion of the selected IP address is not in the node database, determining, by the computer, that the nodal address portion of the selected IP address is not a reference to a node in the network topology.

23. The computer program product of claim 22 further comprising:
  responsive to the computer determining that the nodal address portion of the selected IP address is in the node database, anonymizing, by the computer, the selected IP address by allocating out of an open IP address range spanning a set of viable anonymized replacement IP addresses from octet to octet while preserving the network topology.

24. The computer program product of claim 23 further comprising:
  generating, by the computer, a target anonymized IP address domain model for the network topology based on anonymized IP addresses allocated out of the open IP address range spanning the set of viable anonymized replacement IP addresses.

25. The computer program product of claim 16, wherein the second model retains consistency of source Classless Inter-Domain Routing, retains source IP addressing aggregation, preserves points of network address translation, and preserves non-routed OSI model layer 3 address translation in the mapping of the IP addresses.

* * * * *